(12) United States Patent  
Miyazaki

(10) Patent No.: US 9,172,398 B2  
(45) Date of Patent: Oct. 27, 2015

(54) VEHICLE DATA ABNORMALITY DETERMINATION DEVICE

(75) Inventor: Takehiro Miyazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 482 days.

(21) Appl. No.: 13/642,146

(22) PCT Filed: Jul. 8, 2010

(86) PCT No.: PCT/JP2010/004454  
§ 371 (c)(1),  
(2), (4) Date: Oct. 19, 2012

(87) PCT Pub. No.: WO2012/004836  
PCT Pub. Date: Jan. 12, 2012

(65) Prior Publication Data  
US 2013/0166989 A1 Jun. 27, 2013

(51) Int. Cl.  
*H03M 13/00* (2006.01)  
*H03M 13/05* (2006.01)  
*H03M 13/09* (2006.01)  
*H03M 13/11* (2006.01)  
*F02D 41/26* (2006.01)  
*G06F 21/64* (2013.01)  
(Continued)

(52) U.S. Cl.  
CPC .............. *H03M 13/05* (2013.01); *F02D 41/26* (2013.01); *G06F 21/64* (2013.01); *H03M 13/09* (2013.01); *H03M 13/11* (2013.01); *F02D 2041/228* (2013.01); *H04L 1/0057* (2013.01); *H04L 1/0061* (2013.01)

(58) Field of Classification Search  
CPC ... H03M 13/11; H03M 13/09; H03M 13/091; H03M 13/05; H04L 1/0061; H04L 1/0057; F02D 41/26; G06F 21/64  
USPC .......................... 714/752, 758, 799, 819, 807  
See application file for complete search history.

(56) References Cited

U.S. PATENT DOCUMENTS 5,565,856 A * 10/1996 Takaba et al. ................ 340/3.32  
5,586,118 A * 12/1996 Hashimoto et al. .......... 370/451  
(Continued)

FOREIGN PATENT DOCUMENTS

JP 10-27296 A 1/1998  
JP 2002-82841 A 3/2002  
(Continued)

*Primary Examiner* — Esaw Abraham  
*Assistant Examiner* — Osman Alshack  
(74) *Attorney, Agent, or Firm* — Birch, Stewart, Kolasch & Birch, LLP

(57) ABSTRACT

Disclosed is a vehicle data abnormality determination device including a storage unit for pre-storing a 2-byte remainder term which is a result of a CRC arithmetic operation on a target area for arithmetic operations in a predetermined memory area, and an arithmetic operation unit for performing a CRC arithmetic operation while including the 2-byte remainder term in this CRC arithmetic operation. Because when performing the CRC arithmetic operation, the vehicle data abnormality determination device performs the CRC arithmetic operation while including the 2-byte remainder term in this CRC arithmetic operation after performing an arithmetic operation on the target area, the vehicle data abnormality determination device always makes the computed result be zero when the data has not been falsified, and can detect whether or not the data has been falsified easily and properly.

6 Claims, 9 Drawing Sheets

(51) Int. Cl.
*H04L 1/00* (2006.01)
*F02D 41/22* (2006.01)

(56) References Cited

U.S. PATENT DOCUMENTS

| | | | |
|---|---|---|---|
| 8,151,167 B2* | 4/2012 | Yorimitsu | 714/764 |
| 2002/0029313 A1* | 3/2002 | Funakoshi | 711/102 |
| 2005/0034034 A1* | 2/2005 | Kamada | 714/52 |
| 2006/0047374 A1* | 3/2006 | Hashimoto et al. | 701/1 |
| 2007/0179691 A1* | 8/2007 | Grenn et al. | 701/29 |
| 2009/0134970 A1* | 5/2009 | Iwagami et al. | 340/3.2 |
| 2009/0138137 A1* | 5/2009 | Iwagami et al. | 701/1 |
| 2009/0312898 A1* | 12/2009 | Hashimoto | 701/31 |
| 2012/0245788 A1* | 9/2012 | Pauli | 701/29.1 |

FOREIGN PATENT DOCUMENTS

| | | | |
|---|---|---|---|
| JP | 2002082841 | * | 3/2002 |
| JP | 2005-208958 | A | 8/2005 |
| JP | 2006-72461 | A | 3/2006 |
| JP | 2006072461 | * | 3/2006 |
| JP | 2010-9327 | A | 1/2010 |

* cited by examiner

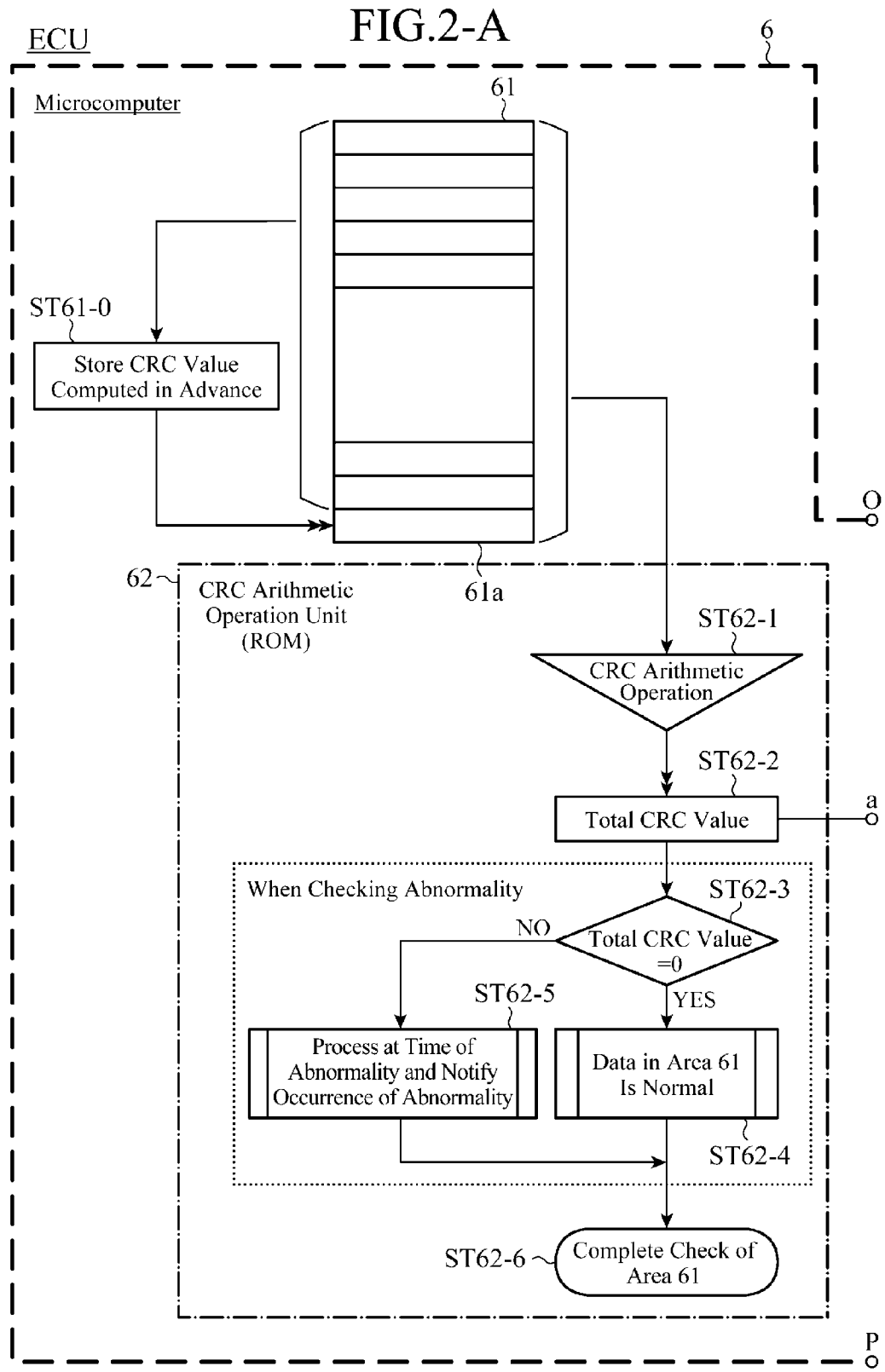

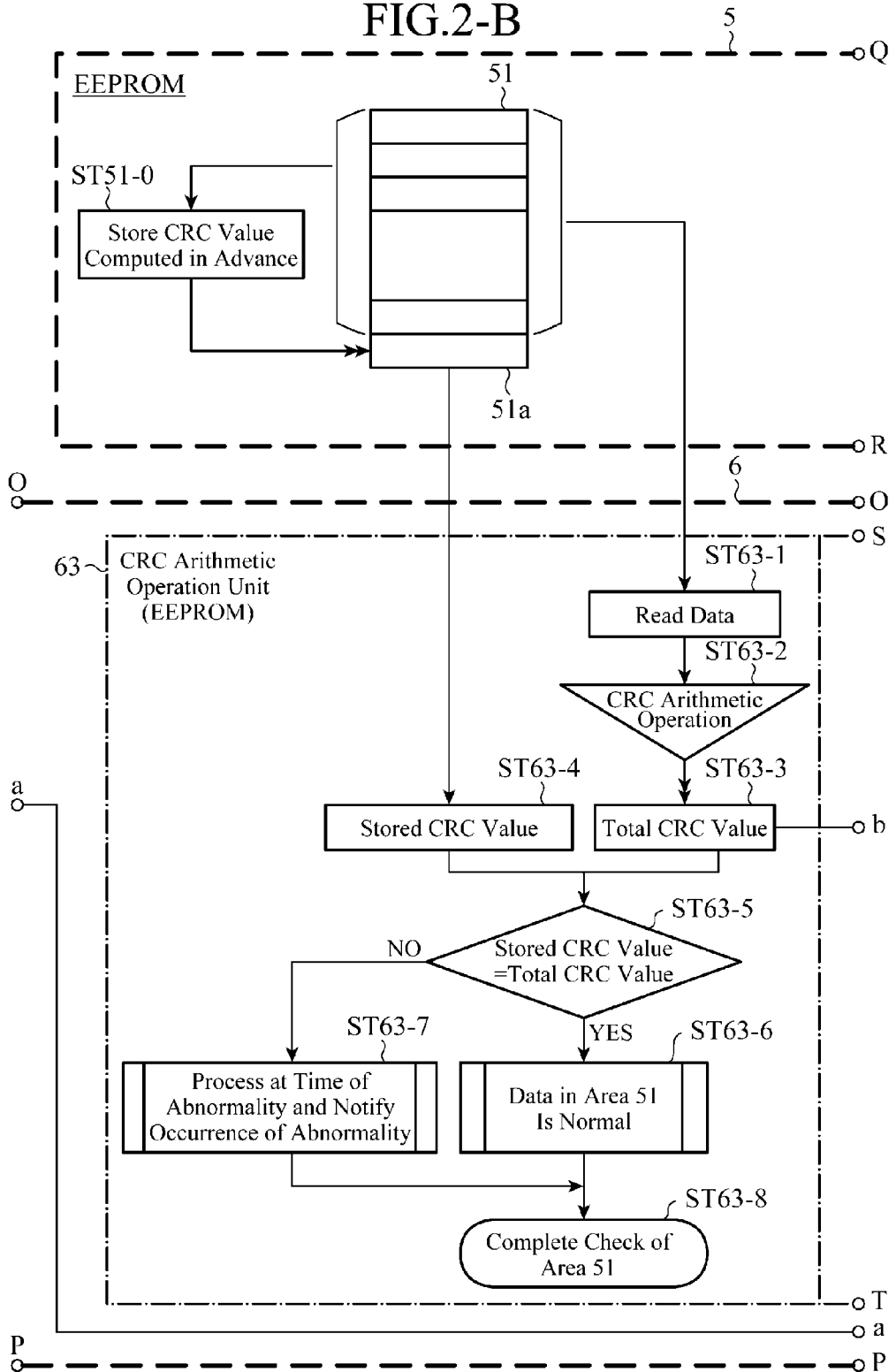

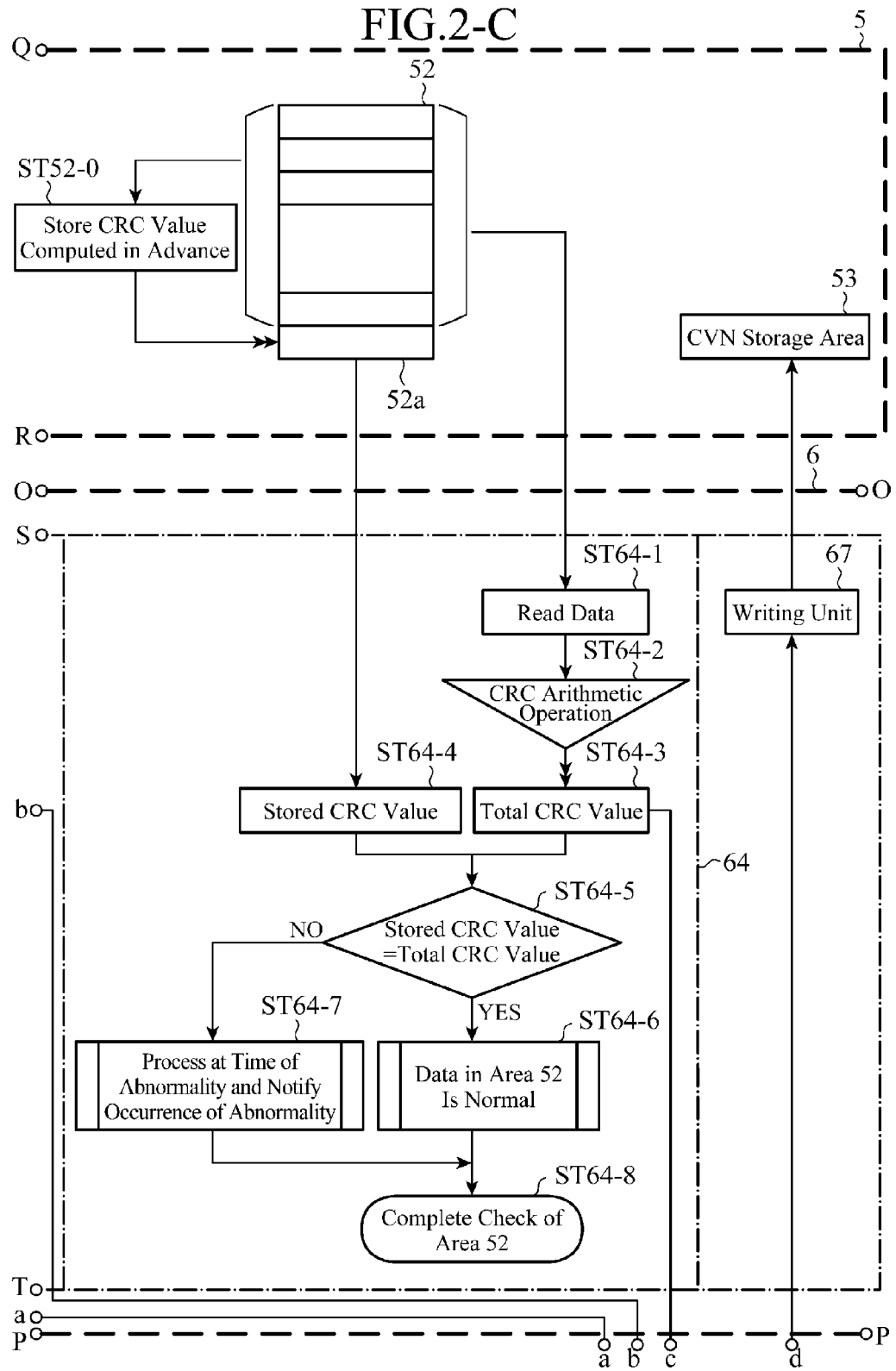

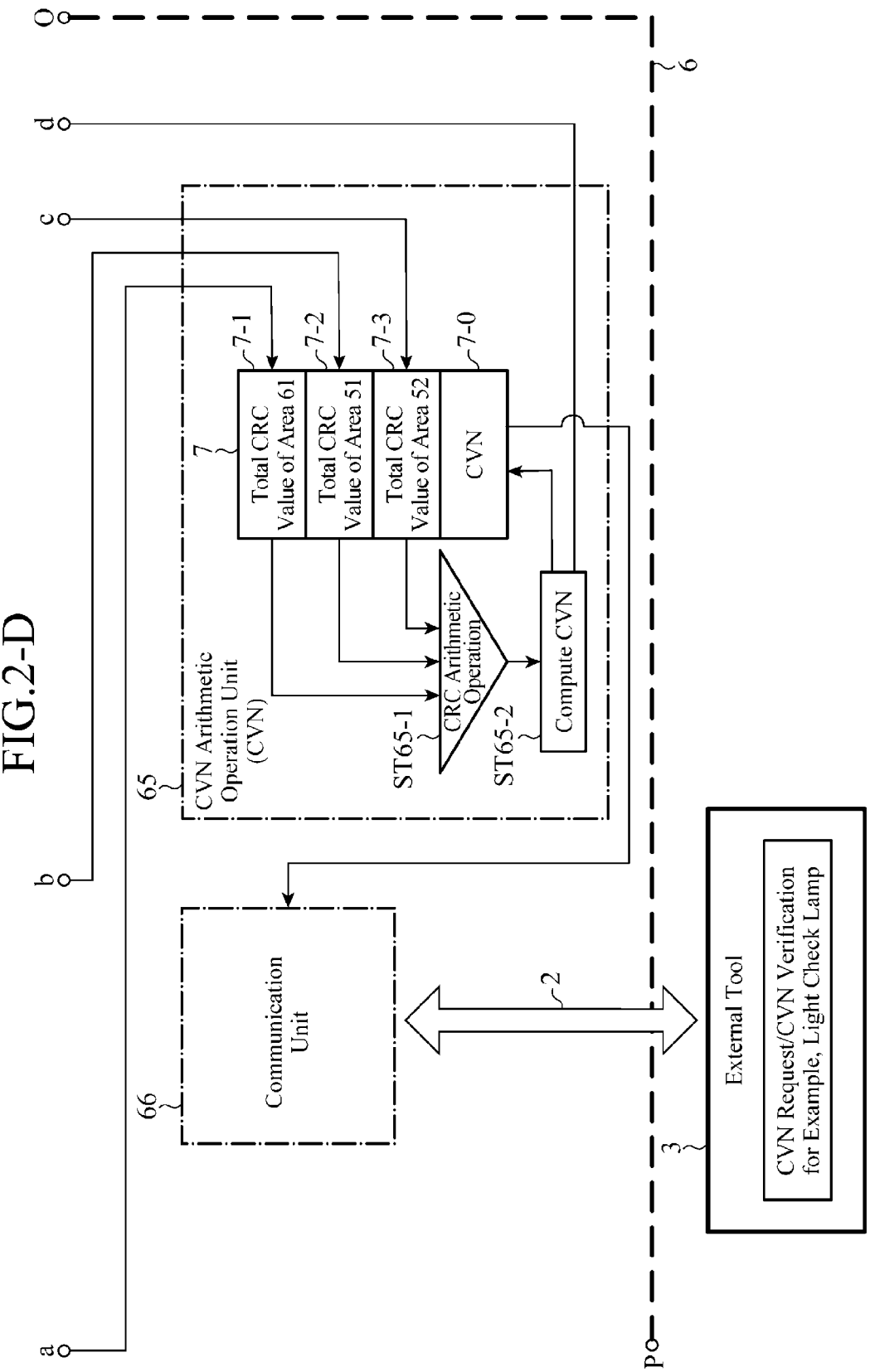
FIG.2-D

VEHICLE DATA ABNORMALITY DETERMINATION DEVICE

FIELD OF THE INVENTION

The present invention relates to a vehicle data abnormality determination device which determines the abnormality of data used for control of a vehicle.

BACKGROUND OF THE INVENTION

Conventionally, in, for example, a brushless motor type turbo actuator, data provided as a control content is stored in a storage unit, such as a microcomputer ROM or EEPROM, and a brushless motor is controlled optimally in accordance with the data, thereby providing an improvement in the fuel efficiency, and a reduction in the amount of toxic substances in exhaust gases. Therefore, when there is a change or there occurs an abnormality in the data stored in the storage unit, the change or abnormality has an influence on the fuel efficiency, elements contained in exhaust gases, etc.

Further, there is a possibility that a change or abnormality in the data stored in the storage unit causes a control operation which is not originally intended to be carried out, and this results in a deterioration of the fuel efficiency and an increase in the amount of toxic substances in exhaust gases. As a result, there is a possibility that a bad influence is exerted upon the engine.

Therefore, there is a demand that vehicles support HD OBD (On-Board Diagnostic System Requirements for 2010 and Subsequent Model-Year Heavy-Duty Engines) of CARE (California Air Resources Board).

One of the HD OBD requirements is to support a CVN (Calibration Verification Number). The CVN is a number used for verifying that "all vehicles must use an arithmetic operation algorithm of computing an independent CVN to check the integrity of an on-board computer which is mounted in each self-diagnostics unit or a unit having an important influence upon emission in which an electrically-rewritable microcomputer or memory is mounted" (however, in accordance with the newest system requirements by CARE, there is a demand to support the CVN regardless of whether or not the microcomputer or memory is electrically rewritable).

More specifically, there is a demand to compute a specific value which is a CVN and read this value from outside each self-diagnostics unit or the like. Although each parts maker needs to examine this arithmetic operation algorithm and obtain approval from CARE, it is fundamentally supposed that what can be guessed easily, such as a checksum, is not approved.

There is a possibility that in a product having a device, such as a flash microcomputer or an EEPROM, in which data can be rewritten, data are changed due to illegal rewriting of the descriptions of the data or a failure occurring in the device after shipment.

Conventionally, in order to prevent such a change in the data, for example, there is a method of setting up a password at a time of rewriting a flash microcomputer, computing a checksum on a program, and checking the check sum value at a time of booting up the flash microcomputer. Further, data stored in an EEPROM is also checked by using a checksum when a microcomputer reads the data.

However, once the password is known, the conventional method is not useful as a measure against falsification of data. Further, a problem with the checksum is that partially rewriting of the data with an evil intention of causing the check sum value not to change can be carried out relatively easily.

As a measure against these problems, an algorithm of computing a specific value which is very difficult to keep constant with respect to a partial change in the data, and which also makes it difficult to guess the computed result from the data, and checking to see whether or not the data is normal by determining whether the specific value changes is effective.

For example, in accordance with "a method of ensuring the integrity of data in a program area of a microcomputer" which is a prior art disclosed by patent reference 1, as a concrete conventional example, a memory is divided into parts in accordance with data blocks and sum check data and an error correcting code are stored together for each of the data blocks in such a way that the detection of an abnormality and restoration can be carried out for each of the data blocks.

RELATED ART DOCUMENT

Patent Reference

Patent reference 1: Japanese Unexamined Patent Application Publication No. 2005-208958

SUMMARY OF THE INVENTION

A problem with this prior art is, however, that an error occurring in data is detected and is then corrected, and the corrected data is rewritten, and it is therefore unpreferable to continue a control operation using the corrected data as control data used for vehicle.

The present invention is made in order to solve the above-mentioned problem, and it is therefore an object of the present invention to provide a vehicle data abnormality determination device which computes data in such a way that the data is hard to falsify, and, when the computed data has been falsified, makes it possible to detect the falsification easily and properly.

In accordance with the present invention, there is provided a vehicle data abnormality determination device including: a storage unit for pre-storing a 2-byte remainder term which is a result of a CRC arithmetic operation on data in a target area for arithmetic operations in a predetermined memory area; and a CRC arithmetic operation unit for, when performing a CRC arithmetic operation, performing the CRC arithmetic operation while including the above-mentioned 2-byte remainder term in this CRC arithmetic operation after performing an arithmetic operation on the target area.

Because the vehicle data abnormality determination device in accordance with the present invention performs the CRC arithmetic operation while including the 2-byte remainder term in this CRC arithmetic operation after performing an arithmetic operation on the target area, there is provided an advantage of always making the computed result be zero, thereby being able to carry out the determination of whether or not the data has been falsified (whether zero or not) easily and properly.

BRIEF DESCRIPTION OF THE FIGURES

FIG. 2-A is one of block diagrams drawn separately and showing the structure of an ECU which is a component of the vehicle data abnormality determination device in accordance with the present invention;

FIG. 2-B is another one of the block diagrams drawn separately and showing the structure of an ECU which is a component of the vehicle data abnormality determination device in accordance with the present invention;

FIG. 2-C is another one of the block diagrams drawn separately and showing the structure of the ECU which is a component of the vehicle data abnormality determination device in accordance with the present invention;

FIG. 2-D is another one of the block diagrams drawn separately and showing the structure of the ECU which is a component of the vehicle data abnormality determination device in accordance with the present invention;

EMBODIMENTS OF THE INVENTION

Hereafter, in order to explain this invention in greater detail, the preferred embodiments of the present invention will be described with reference to the accompanying drawings.

Embodiment 1

Figure 1:
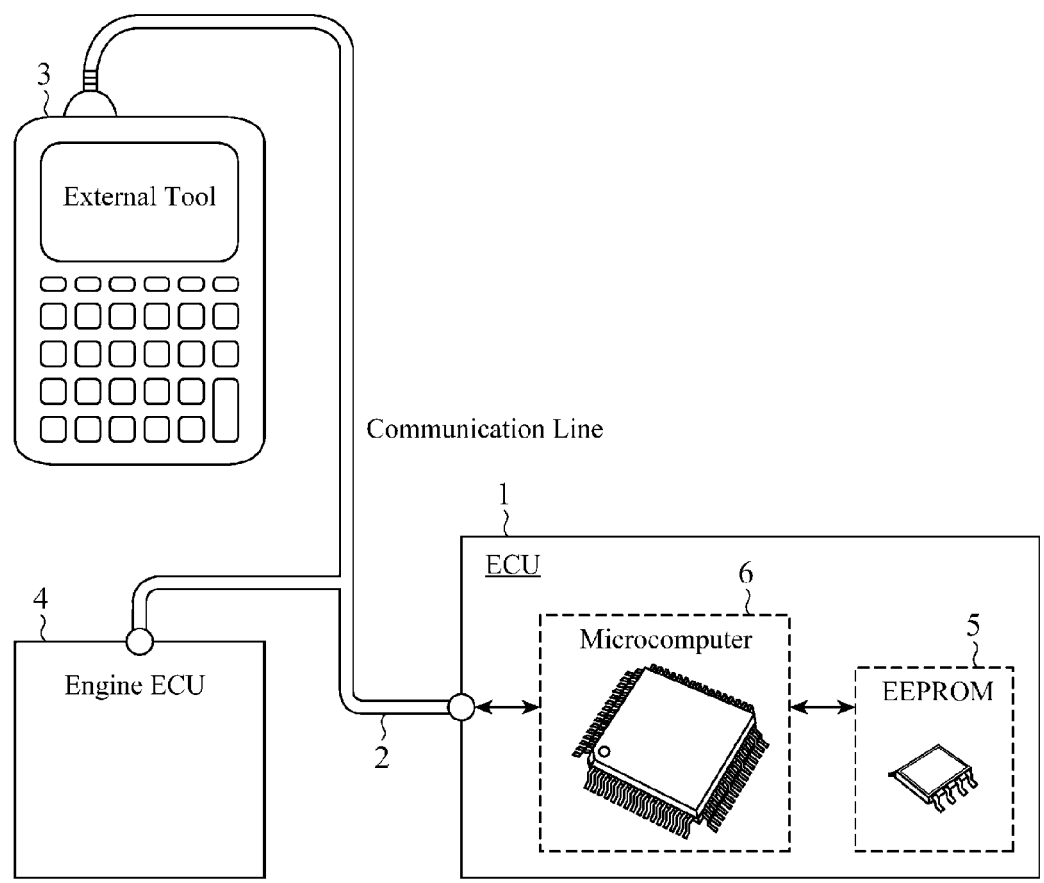
FIG. 1 is a block diagram showing the whole configuration of a vehicle data abnormality determination device in accordance with the present invention.

FIG. 1 is a block diagram showing the whole configuration of a vehicle data abnormality determination device in accordance with the present invention. The vehicle data abnormality determination device is comprised of an ECU 1, an external tool (diagnosis tool) 3 connected to this ECU 1 via a communication line 2, and an engine ECU 4 which are components of the data abnormality determination device. The ECU 1 is provided with an EEPROM 5 and a microcomputer 6.

FIGS. 2-A to 2-D are block diagrams drawn separately and showing the structure of the ECU which is a component of the vehicle data abnormality determination device in accordance with the present invention in detail. Each of pairs of reference characters a to d and O to R in the figures shows a connecting point on the same line. From the viewpoint of the functions of this ECU 1, the ECU 1 is comprised of a CRC arithmetic operation unit 63 for reading data in an area 51 of the EEPROM 5 and checking whether or not this data is abnormal, a CRC arithmetic operation unit 63 for reading data in an area 52 of the EEPROM and checking whether or not this data is abnormal, a CRC arithmetic operation unit 62 for reading data in an area 61 which is a ROM of the microcomputer, and checking whether or not this data is abnormal, and a communication unit 66 for communicating with both a CVN arithmetic operation unit 65 for computing a CVN and the external tool 3. The EEPROM 5 (shown in FIGS. 2-B and 2-C) has the area 51 (customer use block), the area 52 (mass production block), and a CVN storage area 53, and the areas 51 and 52 are constructed in such a way that CRC values computed in advance are stored in storage units 51a and 52a (in step ST51-0 and in step ST52-0), respectively.

The microcomputer (shown in FIGS. 2-A to 2-D) has the area 61 which is a ROM, and this area 61 is constructed in such a way that a CRC value computed in advance is stored in a storage unit 61a (step ST61-0). The microcomputer also has the CRC arithmetic operation unit 62 corresponding to this area 61, the CRC arithmetic operation unit 63 corresponding to the area 61, the CRC arithmetic operation unit 64 corresponding to the area 52, the CVN arithmetic operation unit 65, and the communication unit 66 connected to the external tool 3 via the communication line 2.

The CRC arithmetic operation unit 62 reads data of each block of the area 61 one by one, carries out a CRC arithmetic operation on the data (step ST62-1), and computes a total CRC value of all blocks (step ST62-2). The CRC arithmetic operation unit then determines whether or not the total CRC value is 0 (step ST62-3), and, when YES, determines that the data of the area 61 is normal (step ST62-4). In contrast, because the CRC arithmetic operation unit determines that the data of the area 61 is abnormal when No, the CRC arithmetic operation unit carries out a process at a time of the occurrence of an abnormality. For example, the CRC arithmetic operation unit notifies the occurrence of an abnormality to the engine ECU 4, and the engine ECU 4 lights a check lamp of a vehicle to notify the occurrence of an abnormality to the user (step ST62-5). As a result, the CRC arithmetic operation unit completes the check of the area 61 (step ST62-6).

The CRC arithmetic operation unit 63 reads data of each block of the area 51 of the EEPROM one by one (step ST63-1), carries out a CRC arithmetic operation on the data (step ST63-2), and computes a total CRC value of all blocks (step ST63-3). The CRC arithmetic operation unit then reads a CRC value pre-stored in the storage unit 51a (step ST63-4), and determines whether or not this CRC value is equal to the above-mentioned total CRC value computed thereby (step ST63-5). When the result of the determination shows YES, the CRC arithmetic operation unit determines the data in the area 51 is normal (step ST63-6), whereas when the result of the determination shows NO, the CRC arithmetic operation unit determines the data in the area 51 is abnormal, and carries out a process at a time of the occurrence of an abnormality. For example, the CRC arithmetic operation unit adopts a default value and notifies the occurrence of an abnormality to the engine ECU 4, and the engine ECU 4 lights a check lamp of the vehicle to notify the occurrence of an abnormality to the user (step ST62-5). As a result, the CRC arithmetic operation unit completes the check of the area 51 (step ST63-8).

The CRC arithmetic operation unit 64 reads data of each block of the area 521 of the EEPROM one by one (step ST64-1), carries out a CRC arithmetic operation on the data (step ST64-2), and computes a total CRC value of all blocks (step ST64-3). The CRC arithmetic operation unit then reads a CRC value pre-stored in the storage unit 52a (step ST64-4), and determines whether or not this CRC value is equal to the above-mentioned total CRC value computed thereby (step ST64-5). When the result of the determination shows YES, the CRC arithmetic operation unit determines the data in the area 52 is normal (step ST64-6), whereas when the result of the determination shows NO, the CRC arithmetic operation unit determines the data in the area 52 is abnormal, and carries out a process at a time of the occurrence of an abnormality. For example, the CRC arithmetic operation unit adopts a default value and notifies the occurrence of an abnormality to the engine ECU 4, and the engine ECU 4 lights a check lamp of the vehicle to notify the occurrence of an abnormality to the user (step ST62-5). As a result, the CRC arithmetic operation unit completes the check of the area 51 (step ST64-8). As mentioned above, because the CRC arithmetic operation units 62 to 64 can individually determine whether or not the data in the areas 61, 51, and 52 are normal, respectively, the vehicle data abnormality determination device enables the user to easily and properly know whether the data have been falsified, i.e. varied.

Further, when the arithmetic operations are carried out by the CRC arithmetic operation units 62 to 64, the total CRC value of all the blocks of the area 61, which is acquired in step ST62-2, the total CRC value of all the blocks of the area 51, which is acquired in step ST63-3, and the total CRC value of all the blocks of the area 52, which is acquired in step ST64-3, are inputted to and stored in blocks 7-1, 7-2, and 7-3 of a storage unit 7 which is a RAM of the CVN arithmetic operation unit 65, respectively. The CVN arithmetic operation unit 65 then reads all the total CRC values from the storage unit 7, carries out a CRC arithmetic operation on them (step ST65-1), and computes a CVN (step ST65-2). The computed CVN is written in the CVN storage area 53 of the EEPROM 5 by a writing unit 67. Further, the communication unit 66 transmits either a request from the external tool 3 or the CVN computed at regular intervals to this external tool. In this case, the vehicle data abnormality determination device lights a CVN request/CVN verification check lamp (not shown), for example.

Figure 3:
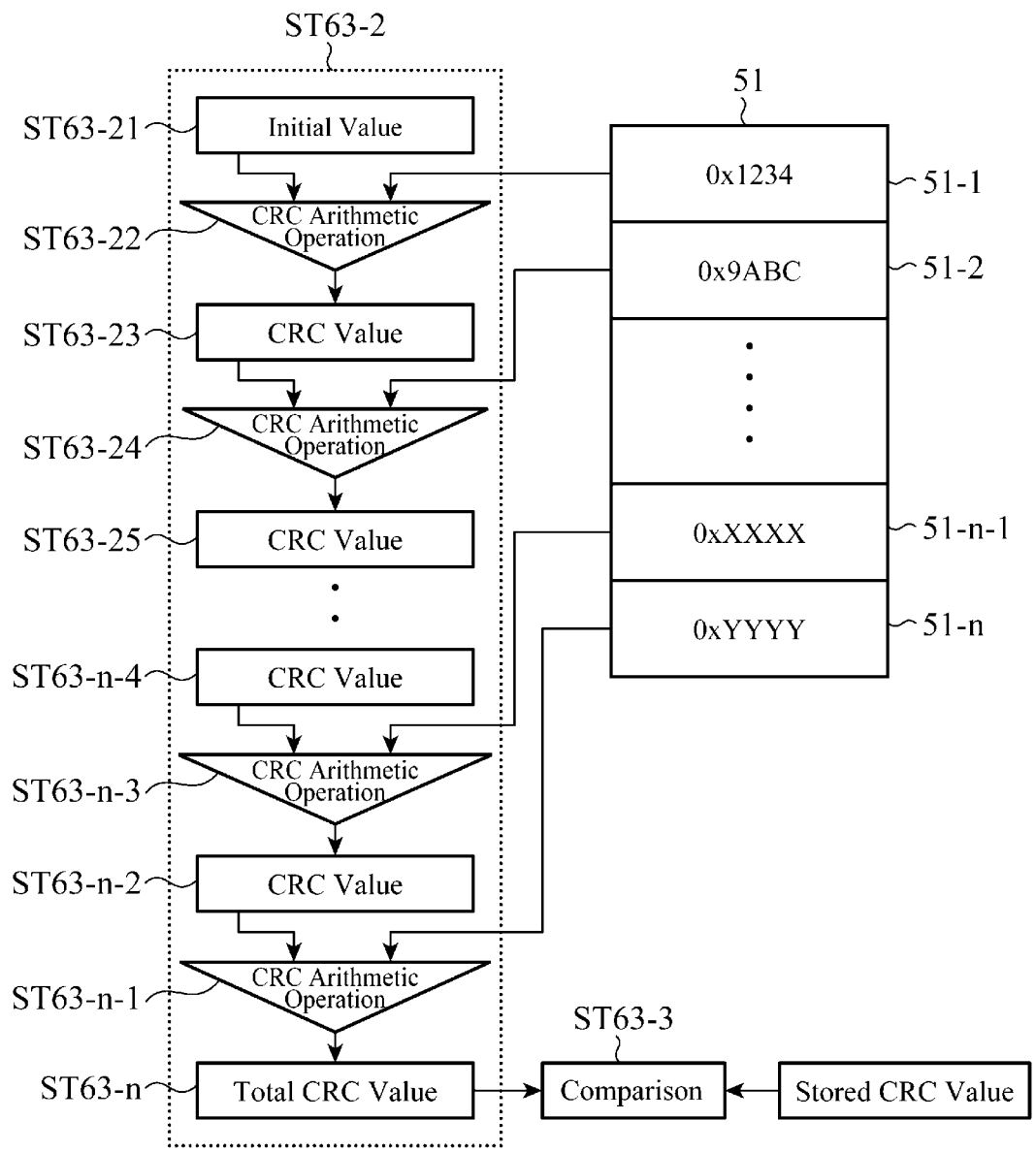
FIG. 3 is a flow chart explaining a CRC arithmetic process carried out by a CRC arithmetic operation unit.

FIG. 3 is a view for explaining the process, in step ST63-2 shown in FIG. 2-B, of carrying out a CRC arithmetic operation on data read from each block of the area 51. The CRC arithmetic operation unit carries out an CRC arithmetic operation on a stored value read from a block 51-1 of the area 51 and a preset initial value (step ST63-21) (step ST63-22). The CRC arithmetic operation unit then carries out a CRC arithmetic operation on a CRC value acquired thereby (step ST63-23) and a stored value read from the next block 51-2 of the area 51 (step ST63-24).

After that, the CRC arithmetic operation unit repeatedly performs a CRC arithmetic operation a CRC value similarly acquired thereby and a stored value read from the next block (steps ST63-24 to ST63-*n*) to carry out a CRC arithmetic operation on the stored values of the data in all the blocks of the area 51 to acquire a total CRC value. The CRC arithmetic operation unit compares the total CRC value acquired thereby with the pre-stored CRC value read from the storage unit 51*a* of the area 51 (step ST63-3), and, when they match each other, can determine that the data stored in the area 51 has not been falsified. The CRC arithmetic operation unit also carries out the same process as that performed on the area 51 on the area 52.

Figure 4:
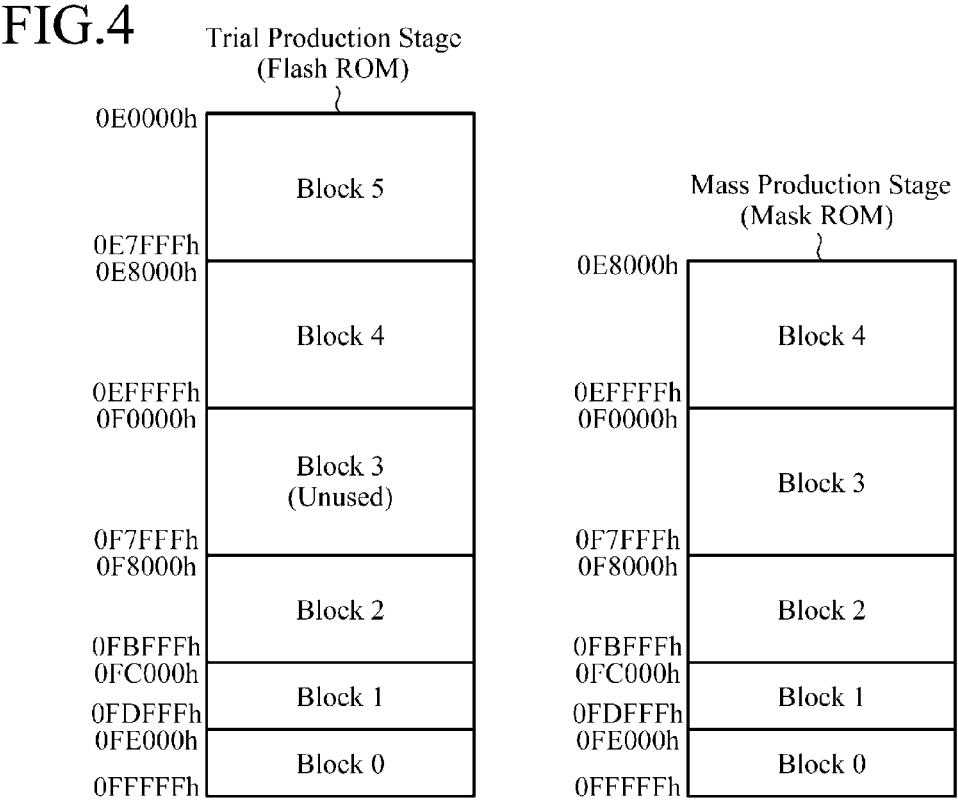
FIG. 4 is an explanatory drawing showing a comparison between a trial production stage (flash ROM) and a mass production stage (mask ROM)

FIG. 4 is an explanatory drawing showing a comparison between a trial production stage (flash ROM) and a mass production stage (mask ROM). At the trial production stage and at the mass production stage, microcomputers having different ROM capacities are used, respectively. A change of the capacity of a ROM causes a change in the allocation of the ROM.

When an object file is generated by changing the allocation of the ROM by using completely the same source code at the time of switching from the trial production stage to the mass production stage, the CRC arithmetic operation on the data stored in each block of the ROM at the trial production stage is not in agreement with that at the mass production stage because the ROM capacity at the trial production stage differs from that at the mass production stage. Because it is necessary to notify a new CVN to the authorities again when the CRC value is changed, it is necessary to incorporate a mechanism of preventing the CRC value from changing at the time of switching from the trial production stage to the mass production stage.

By using the fact that CRC arithmetic operations have a property of providing "0" as a computation result (the remainder of the division of one value by this value is "0") when carrying out a CRC arithmetic operation on the same value, the CRC arithmetic operation unit can store the CRC value which the CRC arithmetic operation unit has computed immediately before computing the 2-byte end of the CRC value in the 2-byte arithmetic block end of each block of the ROM to set the CRC value of the data stored in each data block of the ROM to "0". Because the end of each block of the ROM is a reset vector address and the CRC value cannot be stored in the end, the CRC arithmetic operation unit changes the order of performing arithmetic operations in such a way as to finally carry out a CRC arithmetic operation on an unused block of the ROM. As a result, when the allocation of the ROM is changed, the vehicle data abnormality determination device can make the CRC value at the trial production stage match that at the mass production stage by simply rewriting the value of the two bytes which is completely unrelated to the control to generate an object file.

In both a block 1 at the trial production stage (flash ROM) and a block 1 at the mass production stage (mask ROM) shown in FIG. 4, a variable vector and data (information showing whether or not APL writing is performed, and a password) to which a boot program refers are placed. The boot program places ROM data (program) in both a block 0 at the trial production stage and a block 0 at the mass production stage.

Therefore, because data cannot be placed carelessly in the blocks 0 and 1, the 2-byte end (0FBFFFh and 0FBFFFh) of a block 2 is defined as a CRC arithmetic end block, and the CRC arithmetic operations are performed in the following order. At the trial production stage (128K), the CRC arithmetic operations are performed in the order of block 1→block 0→block 5→block 4→block 2. At the mass production stage (96K), the CRC arithmetic operations are performed in the order of block 1→block 0→block 4→block 3→block 2. Further, because each block of the ROM is large in size and therefore it takes much time to carry out the arithmetic operations, the CRC arithmetic operation unit carries out the CRC arithmetic operations in parallel while the vehicle data abnormality determination device controls the ECU 1.

In the case of the trial production stage (128K), the start address (0E0000h) of the block 5 is set as the start address, and the block 3 is set as the unused block. In the case of the mass production stage (98K), the start address (0E8000h) of the block 4 is set as the start address.

Figure 5:
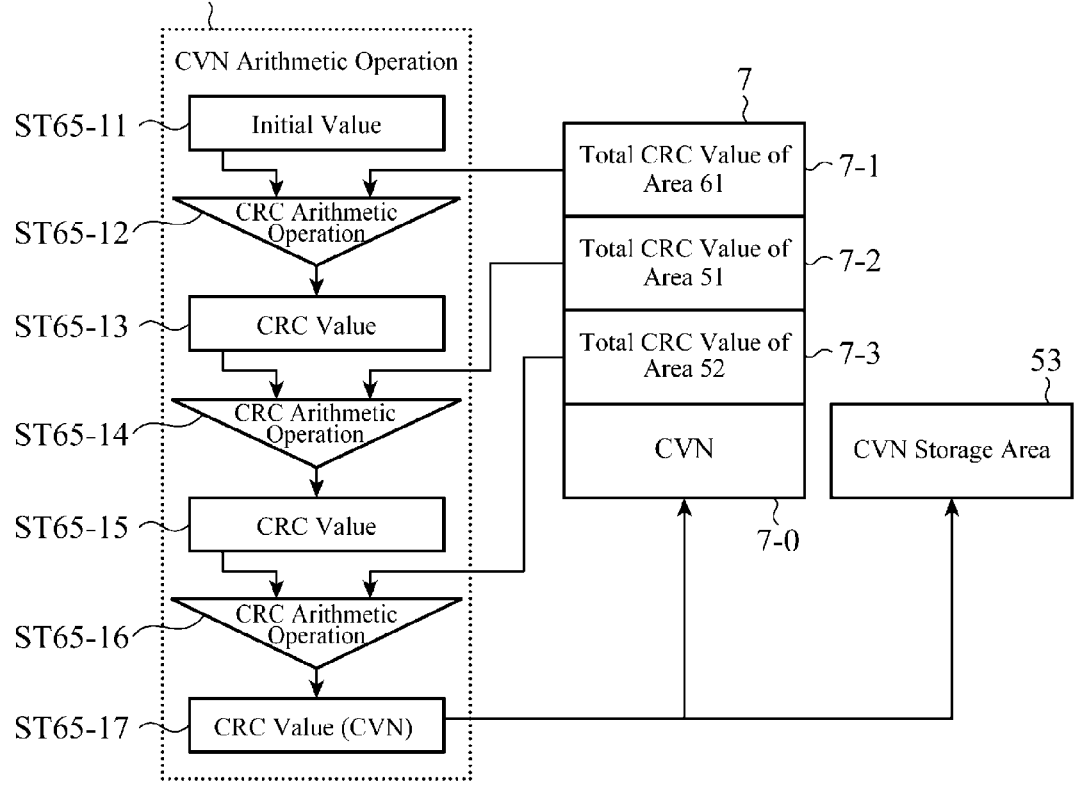
FIG. 5 is a flowchart explaining a process of performing a CVN arithmetic operation which is carried out by a CRC arithmetic operation unit.

FIG. 5 is a flow chart showing the details of the CVN arithmetic operation unit 65. The CRC arithmetic operation unit carries out a CRC arithmetic operation on the total CRC value of all the blocks of the area 61 which is read from the block 7-1 of the storage unit 7, and an initial value which the CRC arithmetic operation unit has acquired in advance by reading in step ST65-11 (step ST65-12), carries out a CRC arithmetic operation on a CRC value acquired thereby (step ST65-13) and the total CRC value of all the blocks of the area 51 which is read from the block 7-2 of the storage unit 7 (step ST65-14), and then carries out a CRC arithmetic operation on a CRC value acquired thereby (step ST65-15) and the total CRC value of all the blocks of the area 52 which is read from the block 7-3 of the storage unit 7 (step ST65-16). The CRC arithmetic operation unit then stores a CRC value acquired thereby (step ST65-17) in a block 7-0 of the storage unit 7 and in the storage unit 53 of the EEPROM 5 as a CVN.

Figure 6:
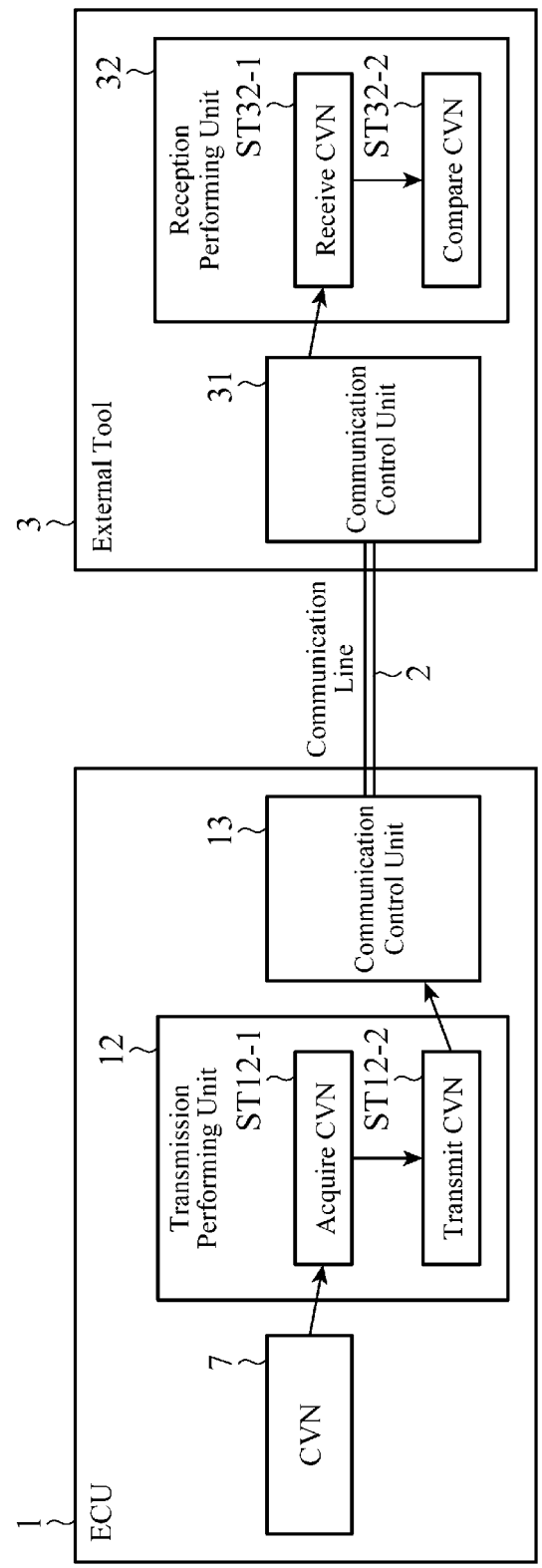
FIG. 6 is a block diagram of a communication control unit for notifying a CVN from the ECU to outside the vehicle data abnormality determination device.

Next, a means for notifying the computed CVN to outside the vehicle data abnormality determination device. There are two types of the notifying means. The first type of notifying means carries out a periodical transmission of the computed CVN via communications (CAN or the like), as shown in FIG. 6. The external tool 3 receives the data transmitted from the ECU 1 to check the CVN.

The ECU 1 is provided with the storage unit 7 which stores the CVN in the block 7-0, a transmission performing unit 12 for reading this CVN from the storage unit 7 (step ST12-1), and transmitting this read CVN (step ST12-2) at fixed time intervals, and a communication control unit 13 for transmitting the CVN transmitted from this transmission performing unit 12 to the external tool 3 via the communication line 2. The external tool 3 is provided with a reception performing unit 32 for receiving the CVN transmitted from the ECU 1 via the communication line 2 (step ST32-1), and comparing the CVN received thereby with a CVN which the external tool has acquired in advance (step ST32-2) to check the CVN.

Figure 7:
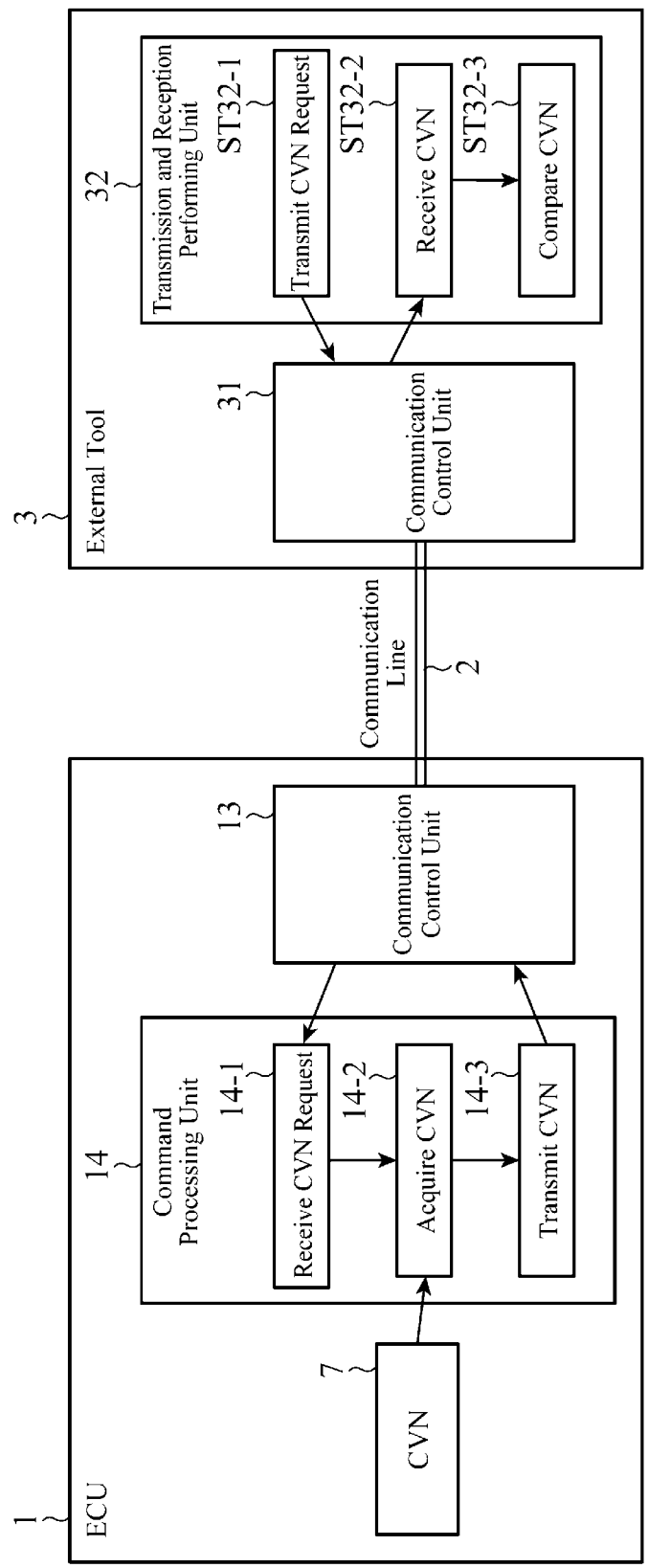
FIG. 7 is a block diagram of a communication control unit for notifying a CVN from the ECU to outside the vehicle data abnormality determination device.

The second type of notifying means transmits a command for requesting the transmission of the CVN to the ECU 1 from the external tool 3, as shown in FIG. 7, and the ECU 1 which has received the command acquires the CVN and sends a command showing the CVN as a reply. The external tool 3 which has received this command checks the CVN.

More specifically, the ECU 1 is provided with a CVN storage unit 7, a communication control unit 13, and a command processing unit 14. The command processing unit 14 receives the command for requesting the transmission of the CVN transmitted from the external tool 3 (step ST14-1), reads the CVN from the storage unit 7 in accordance with this command for requesting the transmission of the CVN (step ST14-2), and transmits a command showing this CVN read thereby to the communication control unit 13 (step ST14-3). The external tool 3 is provided with a communication control unit 31 and a transmission and reception performing unit 32. The transmission and reception performing unit 32 transmits the command for requesting the transmission of the CVN to the communication control unit 31 (step ST32-1), the communication control unit 31 receives the command for requesting the transmission of the CVN transmitted from the ECU 1 via the communication line 2 (step ST32-2), and the external tool compares the CVN based on this received command with a CVN which the external tool has acquired in advance (step ST32-2) to check the CVN.

As mentioned above, when performing CRC arithmetic operations on data in the area 61 which is a ROM, and data in the areas 51 and 52 which are an EEPROM, the vehicle data abnormality determination device in accordance with this Embodiment 1 carries out the arithmetic operations producing a CRC arithmetic result of 0x0000 in some or all of the areas by carrying out the CRC arithmetic operations while including the above-mentioned 2-byte remainder term in each CRC arithmetic operation after performing the arithmetic operation on each target area. Therefore, the present embodiment offers an advantage of making it possible to carry out an arithmetic operation on data in each area in such a way that the data is hard to falsify, and, when data on which an arithmetic operation is performed has been falsified, making it possible to easily detect the falsification for each area. Further, because the vehicle data abnormality determination device further carries out a CRC arithmetic operation on the computed result of each area to compute a CVN, the vehicle data abnormality determination device can offer an advantage of being able to compare this computed CVN with a CVN which the vehicle data abnormality determination device has determined in advance, and, when they match each other, determine that all of the data in the area 61 which is a ROM, and the data in the areas 51 and 52 which are an EEPROM have not been falsified, whereas when they do not match each other, determine that either one of the data in the area 61 and the data in the areas 51 and 52 has been falsified.

Further, when it is difficult to place a 2-byte remainder term at the end of each target area for arithmetic operations, the vehicle data abnormality determination device can change the order in which the vehicle data abnormality determination carries out the arithmetic operations in such a way that the vehicle data abnormality determination finally performs an arithmetic operation on the 2-byte remainder term, thereby imposing no constraints on the placement of the 2-byte remainder term.

Further, in a case in which the flash ROM has a ROM capacity different from that of the mask ROM, an unused area of the flash ROM having a larger ROM capacity is excluded from the target for CRC arithmetic operations and the ROM size for CRC arithmetic operations of the flash ROM is made to be equal to that of the mask ROM so that the time required to carry out the CRC arithmetic operations does not vary at the time of switching from the flash ROM to the mask ROM.

Further, because it takes much time to carry out a CRC arithmetic operation on data stored in the ROM, the vehicle data abnormality determination device is constructed in such a way as to carry out the CRC arithmetic operation on the data stored in the ROM while carrying out normal control. As a result, the vehicle data abnormality determination device can eliminate the influence of a delay on the normal control. Further, because the vehicle data abnormality determination device carries out CRC arithmetic operations by using the CRC-16 standards or the CRC-CCITT standards, even if data has been falsified partially, the vehicle data abnormality determination device can properly know the falsification, and can improve the accuracy of detection of errors in the data.

INDUSTRIAL APPLICABILITY

As mentioned above, because the vehicle data abnormality determination device in accordance with the present invention can carry out an arithmetic operation on data in such a way that the data is hard to falsify, and, when data on which an arithmetic operation is performed has been falsified, can detect the falsification easily and properly, the vehicle data abnormality determination device is suitable for storing a control content used to control, for example, a brushless motor type turbo actuator for vehicles in a storage unit, such as a microcomputer ROM or EEPROM, and optimally controlling the brushless motor in accordance with the content stored in the storage unit.

The invention claimed is:

1. A vehicle data abnormality determination device which determines an abnormality of data used for controlling a vehicle, said vehicle data abnormality determination device comprising:
   a storage to pre-store a 2-byte remainder term which is a result of a Cyclic Redundancy Check (CRC) arithmetic operation on said data in a target area for arithmetic operations, in a predetermined memory area; and
   a CRC arithmetic operator to perform CRC arithmetic operations on the data in the target area, and subsequently on the pre-stored 2-byte remainder term,
   wherein when a flash ROM has a ROM capacity different from that of a mask ROM, a part of the flash ROM having a larger ROM capacity is excluded from a target for CRC arithmetic operations and the ROM capacity of said flash ROM is made to be equal to that of the mask ROM, thereby allowing the flash ROM to be switched to the mask ROM for obtaining a same CRC value for data stored in each corresponding block between the flash ROM and the mask ROM.

2. The vehicle data abnormality determination device according to claim 1, wherein the arithmetic operator changes an arithmetic operation order to finally compute the 2-byte remainder term.

3. The vehicle data abnormality determination device according to claim 1, wherein said CRC arithmetic operator carries out the CRC arithmetic operation on data stored in a ROM while carrying out normal control.

4. The vehicle data abnormality determination device according to claim 1, wherein said CRC arithmetic operator carries out the CRC arithmetic operation by using a CRC-16 or CRC-Comité Consultatif Internationale Télégraphique et Téléphonique (CCITT).

5. The vehicle data abnormality determination device according to claim 1, wherein said vehicle data abnormality determination device includes a Calibration Verification Number (CVN) arithmetic operator for further carrying out the CRC arithmetic operation on the CRC arithmetic result for each of a plurality of storage areas to compute the CVN.

6. The vehicle data abnormality determination device according to claim 5, wherein said vehicle data abnormality determination device includes a communication controller to transmit the computed CVN, and transmits the CVN to an external tool via said communication controller.

* * * * *